United States Patent [19]
Williams, Jr.

[11] Patent Number: 5,586,931
[45] Date of Patent: Dec. 24, 1996

[54] HAND OPERATED CRAB LEG OPENER WITH MULTIANGLED BLADE

[76] Inventor: Richard M. Williams, Jr., 1719 E. Marks St., Orlando, Fla. 32803

[21] Appl. No.: 519,660

[22] Filed: Aug. 25, 1995

Related U.S. Application Data

[63] Continuation-in-part of Ser. No. 287,299, Aug. 8, 1994, abandoned.

[51] Int. Cl.$^6$ .................................................. A22C 29/02
[52] U.S. Cl. .............................................. 452/6; 30/120.1
[58] Field of Search ........................ 452/6, 1; 30/120.1, 30/355

[56] References Cited

U.S. PATENT DOCUMENTS

| | | | |
|---|---|---|---|
| 4,172,306 | 10/1979 | Hopkins | 452/6 |
| 4,200,961 | 5/1980 | Mueller | 452/6 |
| 4,569,103 | 2/1986 | Taurinskas | 452/6 |
| 4,617,734 | 10/1986 | Parkinson | 30/120.1 |
| 5,403,230 | 4/1995 | Capriglione, Sr. | 452/6 |

*Primary Examiner*—Willis Little
*Attorney, Agent, or Firm*—Julian C. Renfro

[57] ABSTRACT

A hand held utensil adapted to open elongate sections of crab leg shells and similar objects comprising a manually engagable handle, a planar blade secured to the handle and extending outwardly to a tip, with the forward portion of the blade adjacent the tip being substantially straight. A blade-protecting member is secured in a spaced relationship adjacent the substantially straight forward portion of the blade, with the blade-protecting member extending from the handle for a distance exceeding the length of the blade. An open-ended slot is defined between the substantially straight forward blade portion and the blade-protecting member, with such slot being adapted to receive the shell of a crustacean, such that the blade can cut through the shell as a user grasping the handle moves the blade longitudinally along the shell. In the preferred embodiment, the blade is multiangled, with a rear portion of the blade extending upwardly from the substantially straight forward blade portion in the direction of the adjacent undersurface of the blade-protecting member. The undersurface of latter member has a recess therein into part of which the upwardly extending rear blade portion extends, thus to provide assured shell-cutting capability when the blade and recess are brought into contact with a crustacean shell. The rear portion of the multiangled blade may extend up smoothly from the substantially straight, forwardmost portion of the blade, or it may form an obtuse angle with the substantially straight forwardmost portion of the blade.

25 Claims, 5 Drawing Sheets

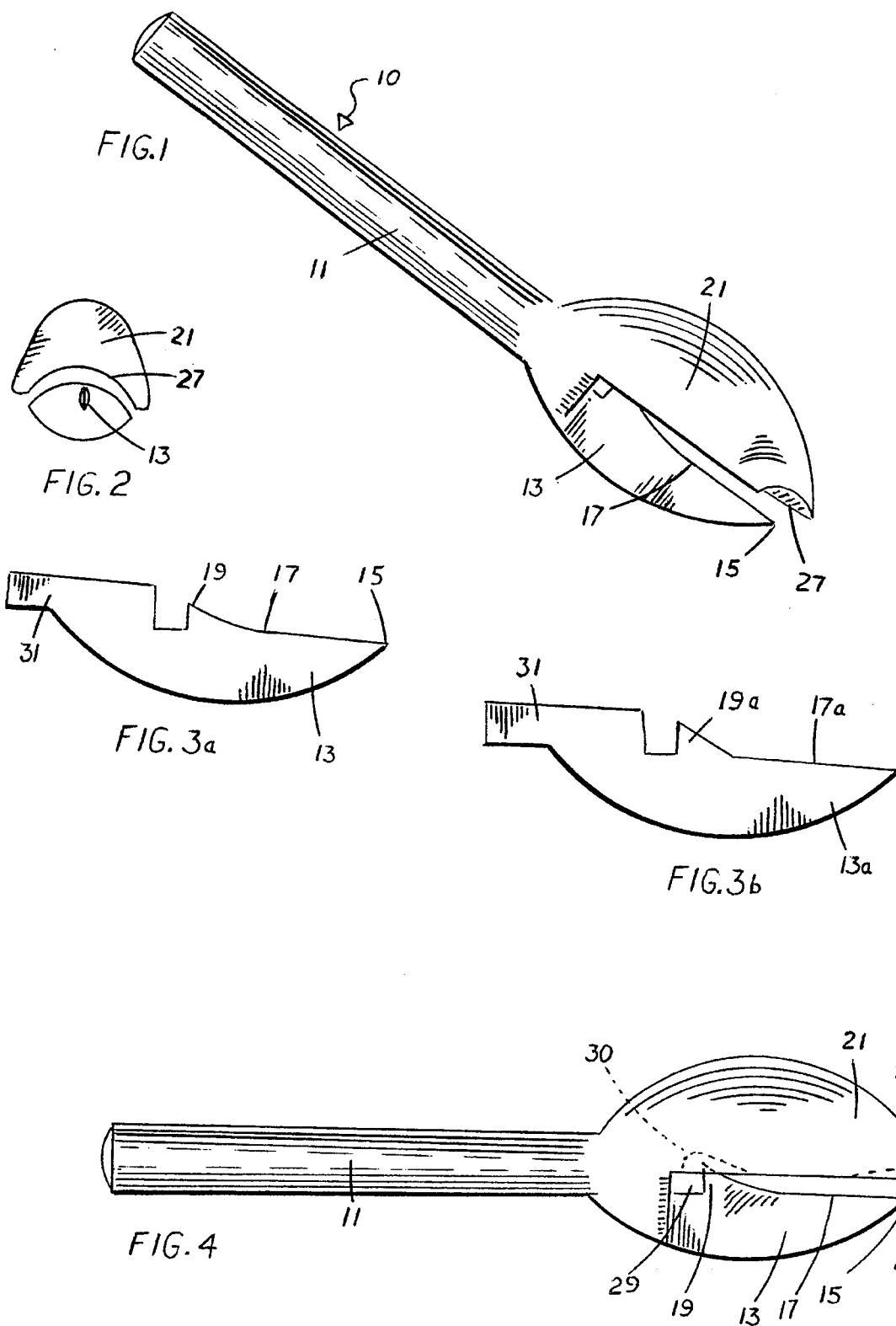

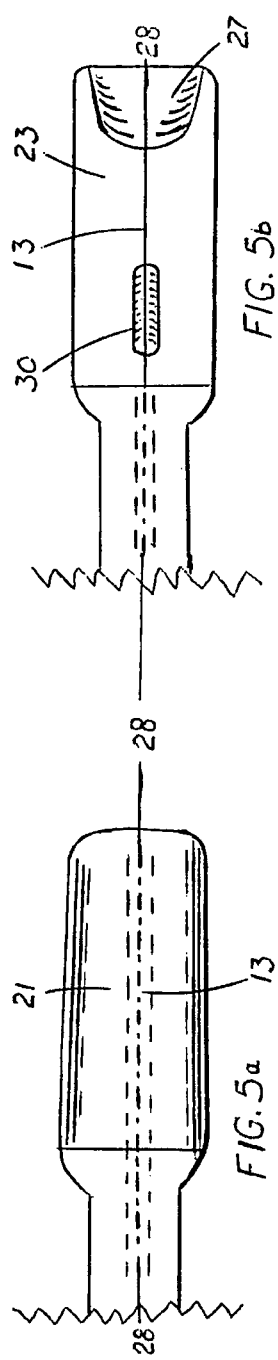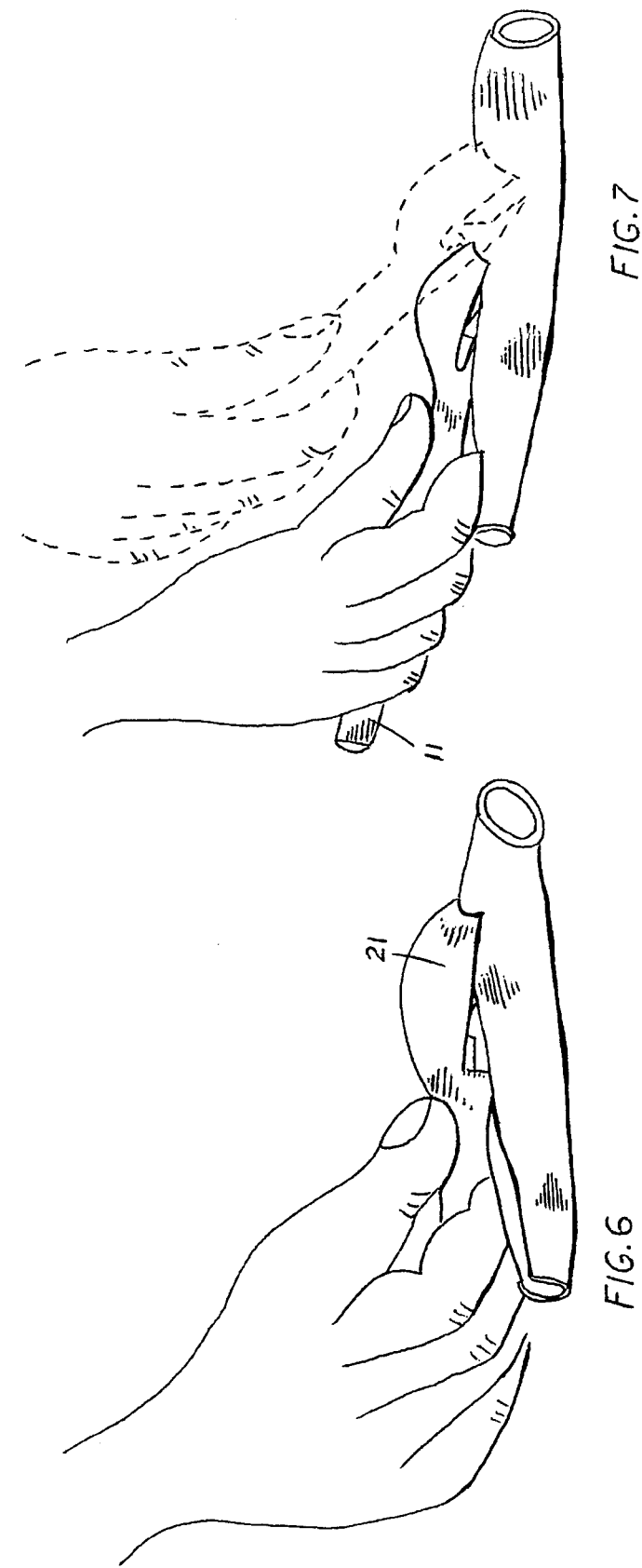

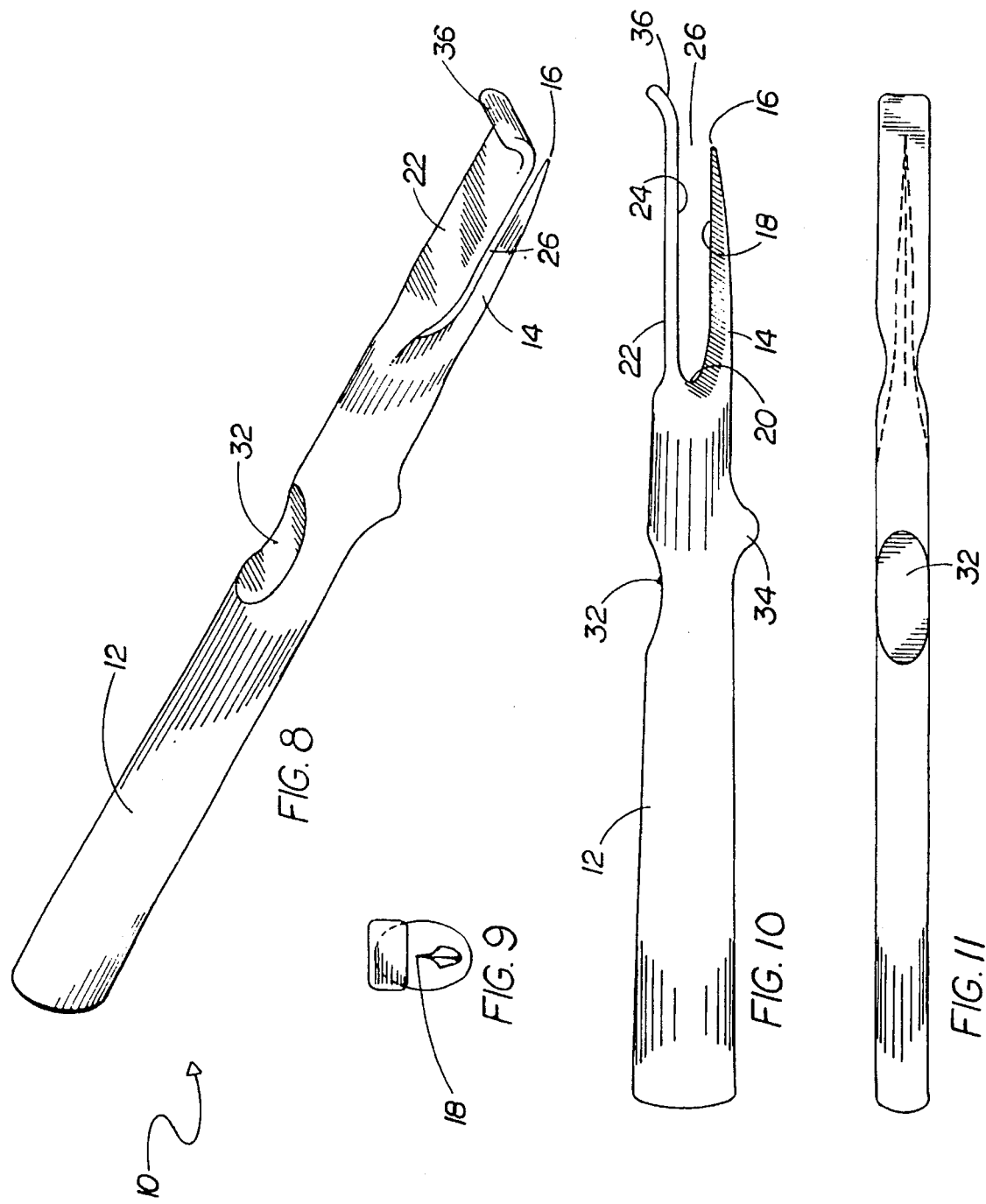

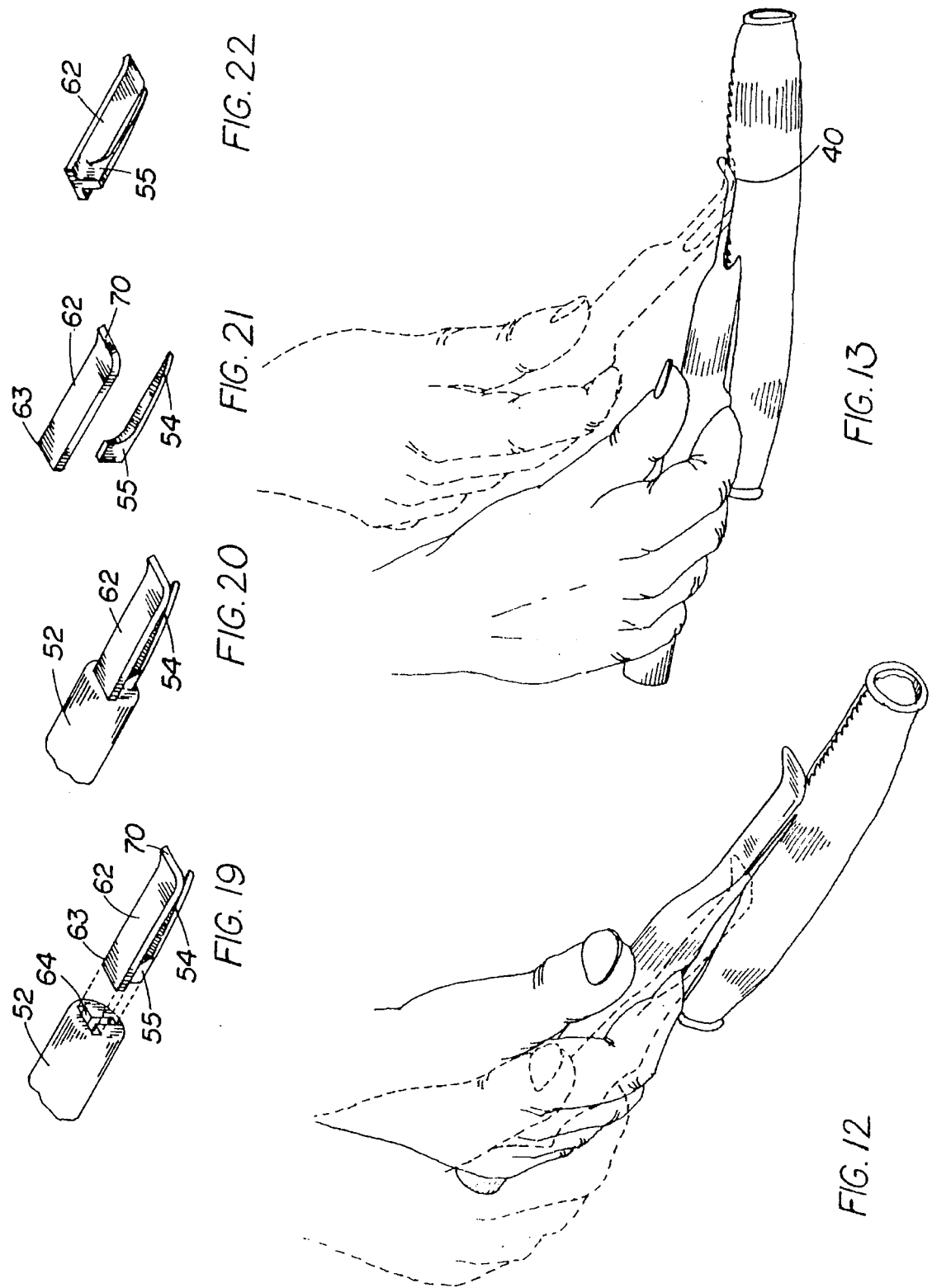

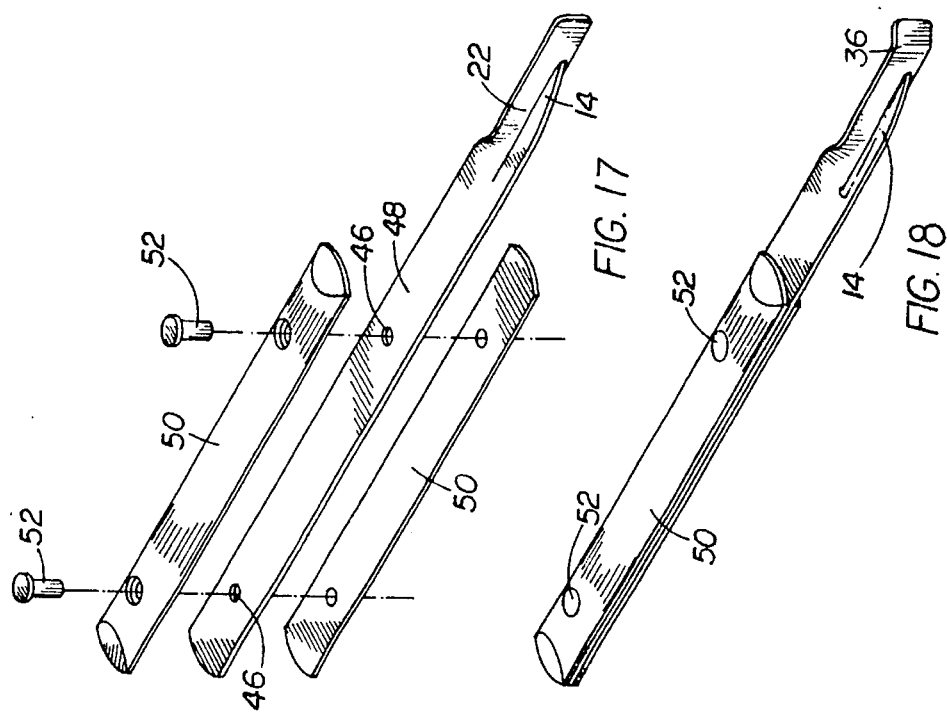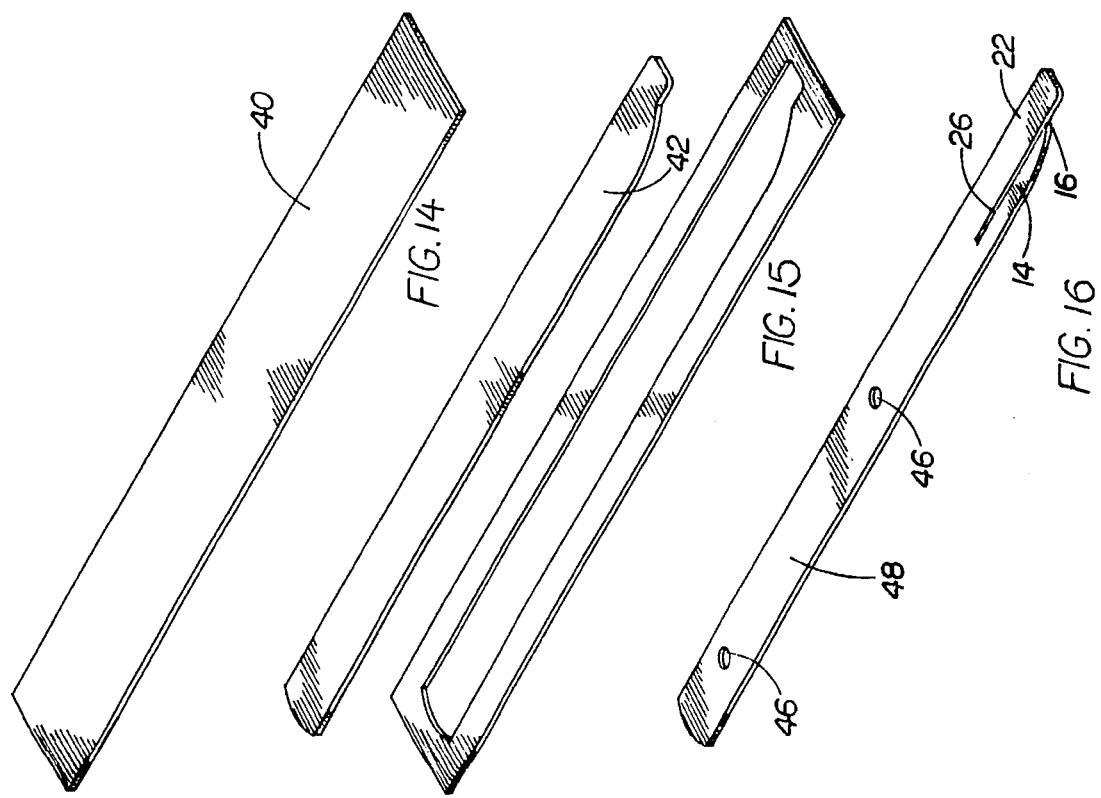

HAND OPERATED CRAB LEG OPENER WITH MULTIANGLED BLADE

RELATIONSHIP TO EARLIER INVENTION

This is a Continuation-in-Part of my patent application entitled "HAND OPERATED CRAB LEG OPENER" filed Aug. 8, 1994, Ser. No. 08/287,299, which is to be abandoned with the filing of this case.

BACKGROUND OF THE INVENTION

1. Field of the Invention

The present invention relates generally to a table utensil, and more particularly to a type of hand held utensil particularly adapted for opening the shells of delicacies such as crab legs.

2. Description of the Prior Art

Crab legs, lobsters and other such shelled delicacies are often served in their shell, which must be opened in order to remove the edible portion. Several types of utensils have been employed in the past for opening these shells.

One such utensil is a knife described in U.S. Pat. No. 4,172,306 to Hopkins. The knife includes a planar blade with an open ended slot extending linearly from a terminal end of the blade along the longitudinal axis of the blade for an inch or two. The slot symmetrically divides the blade into two identical sections. In use, one section of the knife is inserted into the interior of the crab leg, with the other section straddling the exterior of the shell. By lifting upwardly on the knife, the knife is rotated about its terminal end, and acts as a lever to break the shell. However, because a pointed edge is formed at the terminal end of the external fork by the linear slot, lifting of the utensil often causes the pointed edge to pierce the shell of the crab leg and results in an interrupted movement in opening the shell. In addition, damage of the edible portions inside can result since the ends of the sections rotate into the crab meat.

Another type of utensil for removing meat from shells is described in U.S. Pat. No. 4,200,961 to Mueller. The Mueller patent discloses a lobster fork having a plurality of generally parallel tines, and an outermost claw tine. The claw tine is shorter than and angled away from the other tines. To break open a shell, an edge of the shell is inserted between the claw tine and the parallel tines, and the utensil is used as a lever in a manner similar to the Mueller knife. However, because the claw tine is shorter than and diverges from the parallel tines, the fork neither properly grips nor provides proper leverage for narrow, elongated crab leg shells. The diverging claw tine also tends to project into the edible portions of the crab leg.

U.S. Pat. No. 1,843,223 to Hasseler describes a knife having a main blade bifurcated at one end by a longitudinally elongated notch to form a small blade. The sides of the notch extend substantially parallel to one another and are sharpened to provide oppositely disposed cutting edges. The inner end of the notch is a sharpened straight edge which extends substantially oblique with respect to the longitudinal axis of the blade. The sharpened edges of the blade around the notch are arranged to engage and slit the skin of an animal. Because of the hardness of crab leg shells, the cutting action of this type of knife is ineffective. The blades also have pointed, sharpened outer edges, which would result in an interrupted cutting movement due to piercing of the shell by the pointed end of the small blade.

U.S. Pat. No. 296,492 to Wheeler and U.S. Pat. No. 40,163 to Fitch describe ripping instruments having a blade with diverging sections for use in ripping garment seams. The diverging blades are not suitable for use in breaking open crab legs due to the relatively small diameter of the crab leg. If used to open a crab leg, the blade section inserted into the crab leg would greatly damage the meat portion inside due to its diverging disposition.

U.S. Pat. Nos. Des. 307,374 and Des. 307,375 to Kip C. Lubcke each pertain to Shellfish Opening Tools in which a stationary member resides a spaced distance above a blade utilized for opening a shellfish, but neither of these design patents teaches an arrangement in which a blade protecting member extends out further from the handle than does the blade, such that a user, or a person seated adjacent the user, is protected from possible injury from the tip of the blade occurring during use of the tool.

It was in an effort to overcome the disadvantages of these earlier devices that the present invention was created.

SUMMARY OF THE INVENTION

A hand held utensil particularly adapted for opening elongate sections of crab leg shells and similar objects is provided, comprising a manually engagable handle and a planar blade secured to the handle, and extending outwardly therefrom to a terminal end having a somewhat rounded point. The blade has an elongate, substantially straight sharpened edge adapted to travel along the underside of the shell of a crab leg or the like, so as to open the shell and make the meat thereof available to the user of the utensil.

A blade-protecting member or blade guard is secured to the handle and extends in a spaced relationship above the sharpened edge of the blade, with the blade-protecting member extending away from the handle for a distance somewhat exceeding the length of the blade. Because the blade-protecting member is deliberately longer than the blade, the rounded outer edge of the blade-protecting member effectively protects the user from the point of the blade as well as preventing a person adjacent the user from being injured during the opening of a crab leg. Significantly, the plane of the blade-protecting member is in an orthogonal or right-angle relationship to the plane of the blade, such that the sharpened edge of the blade is adjacent a flat undersurface of the blade-protecting member or guard.

An open-ended slot is thus defined between the blade and the blade-protecting member and extends from the terminal end of the blade, substantially along the longitudinal axes of the blade. The blade and the blade-protecting member are thus enabled to straddle the shell of the crustacean, or in other words, the slot is adapted to receive the shell of a crustacean, such that the sharpened edge of the blade can pass along below the shell, and cut the shell as a user grasping the handle forces the blade along the underside of the shell.

Ordinarily the user will be able to open the shell by forcing the blade therealong, but when necessary, the sharpened edge of the blade can be brought forcefully into contact with the underside of the shell as a result of lifting the handle, thus to cause a forward portion of the blade-protecting member to pivot upon an upper portion of the shell, and to cause the shell to break at the location of the sharpened edge of the blade. If the shell is particularly tough, the user may need to lift the handle several times during the movement of the blade along the shell, in a form of prizing motion.

In accordance with a primary embodiment of this invention, I provide a hand held utensil adapted to open elongate sections of crab leg shells and similar objects, the utensil comprising a manually engagable handle and a planar blade secured to the handle and extending therefrom to a terminal end. In this preferred embodiment, a multiangled blade is utilized, which involves a forward portion having a substantially straight sharpened edge which merges into an upwardly extending blade portion. A blade-protecting member is secured in a spaced relationship adjacent the substantially straight sharpened edge of the blade, with the blade-protecting member extending for a distance exceeding the length of the blade. An undersurface of the blade-protecting member is in a plane that is in a substantially orthogonal relationship to the plane of the blade. An open-ended slot is defined between the substantially straight sharpened edge of the blade and the blade-protecting member and extending from the terminal end substantially along the longitudinal axis of the blade, the slot being adapted to receive the shell of a crustacean, such that the sharpened edge of the blade can cut through the shell as a user grasping the handle moves the blade longitudinally along the shell.

In one version of the primary embodiment of this invention, the blade is multiangled, with a rear portion of the sharpened blade edge angled smoothly upwardly in the direction of the undersurface of the blade-protecting member. A recess is provided in the undersurface of the blade-protecting member, into which a part of the upwardly extending portion of the blade extends, thus to provide assured shell-cutting capability when the shell of a crustacean reaches the location of the blade and the blade-receiving recess.

In another version of the preferred embodiment, the upwardly extending blade portion forms an obtuse angle with the substantially straight portion of the blade.

In accordance with a secondary embodiment of my invention, my hand held utensil may be of single piece construction, stamped from a flat piece of metal, after which the blade-protecting portion is twisted for approximately 90°, so as to cause the blade-protecting member to reside in a right-angle relationship to the blade. On the other hand, the handle member can be constructed of an entirely different material, such as plastic or wood, which is notched or slotted so as to receive the mounting portions of the blade and the blade-protecting member.

It is a principal object of this invention to provide a hand held utensil for opening crab leg shells and the like, characterized by its effectiveness, its ease of operation, its safety, and its low cost.

It is another object of this invention to provide a hand held device particularly adapted for the rapid and highly effective opening of the shells of crustaceans.

It is still another object of this invention to provide a hand operated shell-opening device usable for cutting a shell open by the application of a steady, linear force, or else by a cutting procedure involving the handle being repeatedly lifted in order to break a small section of the shell at a time, by a form of prizing action.

It is yet another object of this invention to provide a hand held utensil for opening crab leg shells and the like, wherein a sharpened blade and a blade-protecting member are provided in a spaced-apart relationship, with the blade-protecting member extending out further than the tip of the blade, thus providing a safety feature in that the blade-protecting member effectively prevents the user or a person adjacent the user from being accidentally injured by the sharpened blade during usage of the device.

It is yet still another object of this invention to provide a hand held utensil for opening crab leg shells and the like, wherein a blade-protecting member is utilized in a spaced apart relationship to the blade-protecting member, with this not only adding a safety feature by being longer than the blade, but also providing, by virtue of being disposed in an orthogonal relationship to the blade, a relatively broad fulcrum point, thus preventing the undesirable breakage of the shell during a prizing action.

It is yet still another object of this invention to provide a hand held utensil having a novel multiangled blade involving a substantially straight forward portion merging into an upwardly extending rear blade portion in which at least a part of the upwardly extending rear blade portion extends into a slot or recess formed in the underside of the blade-protecting member, thus to assure that the shell of the crustacean will be cut.

It is yet still another object of this invention to provide a utensil utilizing a blade-protecting member extending out further than the blade, with the front edge portion of the blade-protecting member having a curved contour configured to be moved along the top of a crab leg shell or the like being cut, thus to provide a significant guide function in addition to preventing the user or a person sitting adjacent the user being accidentally injured by the sharpened blade during usage of the utensil.

It is yet still another object to provide an embodiment of a hand held utensil for opening the shells of crustaceans and the like, which utensil can be stamped out of flat metal plate, and then configured into a useful utensil while utilizing a minimum of forming steps.

It is yet still another object to provide a hand held utensil for opening the shells of crustaceans and the like in which the utensil can be manufactured as one integral piece, or else have a blade portion separable from the handle portion.

These and other objects, features and advantages will be more apparent upon a study of the enclosed drawings.

BRIEF DESCRIPTION OF THE DRAWINGS

FIG. 1 is a perspective view of a primary embodiment of my novel hand held utensil adapted for opening the shells of crustaceans and the like, involving an elongate blade disposed in spaced relation to a blade-protecting member of substantial size;

FIG. 2 is an end view, showing the important relationship of the contoured front portion of the blade-protecting member to the shell of the crustacean, with the planar blade being located directly below the front portion of the blade-protecting member;

FIG. 3a is a version of a multiangled blade configuration usable with the primary embodiment of my invention, revealing that this planar blade has a substantially straight forward edge, with the rear portion of the sharpened blade extending smoothly upwardly in the direction of the underside of the blade-protecting member;

FIG. 3b is a another blade configuration usable with the primary embodiment of my invention, with the rear portion of the sharpened blade extending upwardly at a distinct angle in the direction of the underside of the blade-protecting member;

FIG. 4 is a side elevational view of the novel hand held utensil in accordance with the primary embodiment of my invention, revealing the slot existing between the front portion of the sharpened edge of the blade and the blade-protecting member located thereabove, with this figure also revealing that the rear or inner portion of the sharpened edge of the planar blade may extend upwardly into a recess provided in the portion of the blade-protecting member nearest the blade;

FIG. 5a is a view from above of the blade-protecting member, showing the rounded forward edge of this member, with the location of the sharpened edge of the blade below the blade-protecting member being indicated by the use of dashed lines;

FIG. 5b is a view from below the blade-protecting member, revealing that the underside of the front edge portion of the blade-protecting member has a curved contour or concavity that is configured to provide a guide function when moved along the top of a crab leg shell, and additionally showing the slot or recess in the undersurface of the blade-protecting member into which at least a portion of the upwardly extending rear blade portion extends;

FIG. 6 is a fragmentary perspective view of my novel hand held utensil being utilized for cutting a crustacean shell or the like by a steady, linear motion, with the curvature of the forward portion of the blade-protecting member substantially conforming to the external portion of the crustacean shell, thus serving to prevent the tool from slipping off the shell during use;

FIG. 7 is a fragmentary view similar to FIG. 6, but showing the use of my device in a different mode, namely, when a particularly tough portion of shell has been encountered, it becomes possible for the user to lift the handle of the utensil, thus causing the blade-protecting member to pivot upon an exterior portion of the shell such that the sharpened blade is raised to achieve an upward breaking of a portion of the crustacean shell;

FIG. 8 is a perspective view of a secondary embodiment of my novel hand held utensil adapted for opening the shells of crustaceans and the like, involving an elongate blade disposed in spaced relation to a blade-protecting member;

FIG. 9 is an end view, showing in greater detail, the relationship of the blade of this secondary embodiment of my utensil to the blade-protecting member located immediately thereabove;

FIG. 10 is a side elevational view of the novel hand held utensil in accordance with the secondary embodiment of my invention, revealing the slot existing between the sharpened edge of the blade and the blade-protecting member located thereabove, with this figure also revealing that the innermost portion of the sharpened edge of the planar blade may extend upwardly toward the blade-protecting member that is disposed in a spaced relationship above the sharpened edge of the blade;

FIG. 11 is a view from above of the blade-protecting member, showing the rounded terminal edge of this device, with the location of the sharpened edge of the planar blade below the blade-protecting member being indicated by the use of dashed lines;

FIG. 12 is a fragmentary perspective view of the secondary embodiment of my novel hand held utensil being utilized for cutting a crustacean shell or the like by a steady, linear motion;

FIG. 13 is a fragmentary view similar to FIG. 12, but showing the use of this embodiment of my device in a different mode, namely, when a particularly tough portion of shell has been encountered, and it becomes necessary to lift the handle of the utensil, thus to cause the blade-protecting member to pivot upon an exterior portion of the shell such that the sharpened edge of the blade is forcefully raised to achieve an upward breaking of a portion of the shell;

FIG. 14 is a view of a typical flat metal blank out of which a utensil in accordance with the secondary embodiment of this invention may be stamped;

FIG. 15 is a view of the basic configuration of the hand held utensil in accordance with the secondary embodiment of my invention, before any cutting or bending steps have been performed;

FIG. 16 is a view after a slot has been cut in one end of the stamping, thus to create the planar blade and the blade-protecting member;

FIG. 17 is a view showing the blade-protecting member or guard of this secondary embodiment having been twisted approximately 90°, so as to cause the undersurface of this member to be spaced away from the sharpened edge of the blade member;

FIG. 18 is a view of the final utensil in accordance with the secondary embodiment after the upper end of the blade-protecting member has been bent to formed the upturned portion, and after the hand-engaging members have been riveted to the basic handle portion of the utensil;

FIG. 19 is a fragmentary perspective view of still another embodiment, showing the end of the handle prior to the insertion of the blade and the blade-protecting member into a slot provided in the end of the handle;

FIG. 20 is a fragmentary view similar to FIG. 19, but showing the blade and blade-protecting member having been inserted into the handle;

FIG. 21 is a view illustrating that the blade and the blade-protecting member of this particular embodiment may be separate; and FIG. 22 is a view making clear that the blade and the blade-protecting member may be secured together to form an integral unit.

DETAILED DESCRIPTION

The preferred embodiment of my hand held utensil 10 adapted for opening elongate sections of crab leg shells and similar objects is revealed in FIG. 1, with this embodiment being seen to comprise a manually engagable handle 11, upon one end of which a planar blade 13 is fixedly secured. The blade 13, typically of stainless steel, extends away from the handle essentially parallel to the longitudinal centerline of the handle, with the blade terminating in an end or point 15 that is somewhat rounded rather than being sharp. The blade 13 is fixedly secured to the handle 11, and in the preferred instance is integral with the handle. The handle 11 may be oval in cross-section, and preferably is made of a FDA approved plastic, such as a high impact styrene. However, I am not to be limited to this, and in some instances the handle could be made of wood, ceramic or metal instead of plastic.

As will be described at length hereinafter, my novel hand held device is intended to open a crab leg or other portion of a shellfish or crustacean by a user grasping the handle 11 and moving the utensil forwardly by a generally uniform linear motion. This opening action is brought about by the interaction of the blade 13 with the member of the utensil that is disposed directly above the blade, in a manner described in greater detail hereinafter.

FIGS. 1 and 4 reveal that a blade-protecting member 21 resides directly above the blade 13, with the front of the member 21 extending outwardly beyond the end or point 15 of the blade 13; note FIG. 4 in particular. In other words, the blade-protecting member 21 extends away from the handle 11 for a distance exceeding the length of the forward or tip portion 15 of the blade 13. The upwardly rounded blade-protecting member 21 is seen to extend in a spaced relationship above the relatively straight forward edge portion 17 of the blade 13, such that a slot 25 best seen in FIG. 4 is defined therebetween.

In FIG. 3a is a version or embodiment of a multiangled blade utilized in accordance with the primary embodiment of my invention, with this figure revealing that this planar blade has a substantially straight forward edge or forward-most portion 17. It will be noted that the rear portion 19 of the blade 13 extends upwardly at a smooth angle with respect to the relatively straight forwardmost portion 17. As will be seen from FIG. 4, the rear portion 19 of the sharpened blade 13 extends smoothly upwardly in the direction of the undersurface 23 of the blade-protecting member 21.

In FIG. 3b I have shown a version of a multiangled blade in which the rear portion 19a of the blade extends upward at a distinct obtuse angle with respect to the relatively straight forward blade portion 17a. This angle between the sharpened edges of the blade portions may range between 120 degrees and 170 degrees, with an angle of 130 to 140 degrees being typical. However, I am not to be limited to this range of angles.

FIG. 4 is a side elevational view of the primary embodiment of my invention, with this view showing how the planar blade 17 is arranged with respect to the blade-protecting member 21. FIG. 5a, which is a view looking down from above upon the blade-protecting member 21, reveals that the planar multiangled blade member 13 is disposed on the centerline 28 of the member 21 and the handle 11.

It is important to note from FIG. 4 that whereas the substantially straight forwardmost portion 17 of the blade 13 is spaced substantially evenly from the undersurface of the blade-protecting member 21, a part of the rearmost blade portion 19 extends upwardly into a recess or slot 30 denoted in FIG. 4 by a series of dashed lines. As revealed by FIG. 5b, the slot or recess 30 is located on the centerline 28 on the undersurface 23 of the blade-protecting member 21.

it is to be understood that the undersurface 23 of the blade-protecting member or guard 21 may be regarded as generally residing in an orthogonal or right-angle relationship to the plane in which the blade 13 is disposed. It is thus to be seen that the sharpened, relatively straight forwardmost portion 17 of the blade is in a fixed relationship adjacent the undersurface 23 of the blade-protecting member 21.

It should now be clear that the aforementioned open-ended slot 25 is defined between the substantially straight forward portion 17 of the blade 13, and the undersurface 23 of the blade-protecting member 21, with this slot extending from the pointed outermost or terminal end 15 of the blade, substantially along the longitudinal axis of the blade. However, an important feature of this preferred embodiment of my invention involves the forward part of the blade 13 blending upwardly so as to form the rear portion 19 of the blade, which portion protrudes into the aforementioned recess or slot 30 formed in the undersurface 23 of the blade-protecting member 21. As a result of this construction, the portion of a crab shell or the like inserted into the slot 25 encounters the upwardly extending rear blade portion 19. This brings about assured shell-cutting capability in that it forces the shell to be cut in a highly desirable manner, as will be described in detail hereinafter.

It is important to note from FIG. 1 and FIG. 5b that the undersurface 23 of the blade-protecting member 21 has an arcuately shaped tip portion 27 that is designed to generally conform to the configuration of the upper surface of the crab leg to be opened. This arcuately shaped or concave portion 27 advantageously prevents the blade-protecting member 21 from sliding from side to side during the procedure in which a crab leg is being opened by the linear motion of the blade 13 therealong; note FIG. 6. For this reason I may refer to the member 21 as a guide or guide member.

As revealed in dashed lines in FIG. 4, the angularity of the arcuately shaped tip portion 27 typically resides in the range of 10° to 20° to the centerline of the handle 11. This arrangement is advantageous in that when the arcuately configured tip portion is being moved along in close conformance with the upper surface of the shell in the manner illustrated in FIG. 6, a suitable amount of clearance is provided for the fingers of the user.

Because of the blade-protecting member or guide 21 being of substantial size in this principal embodiment of my invention, it may be used as a form of shell cracker by the user turning the utensil over and striking the shell with the rounded upper portion of the member 21.

FIGS. 1 and 4 make clear that the elongate, substantially straight forwardmost portion 17 of the blade 13 extends for only a part of the length of the blade, with this forward blade portion 17 being integral with the upwardly extending rear blade portion 19. The upper edges of both the forward and rear portions of this novel multiangled blade 13 are sharpened, with a primary embodiment of this blade being seen in FIG. 3a.

With regard to the length of the cutting portion of the blade 13, the sharpened portion of the blade may be between one and two inches long, with a typical length of the sharpened portion being approximately 1.5 inches long. The substantially straight sharpened forward portion 17 may extend for approximately 50% of the length of the blade, with the upwardly extending rear portion 19 constituting the other 50% of the length of the sharpened blade portion. Quite obviously, I am not to be limited to these lengths or these percentages.

To be noted, particularly in FIG. 4, is a space 29 provided behind the upwardly extending blade portion 19, through which space broken shell pieces and the like can readily fall away, and not cause clogging of the utensil. The space 29 also facilitates cleaning.

The rearmost or mounting portion 31 of the blade 13 is typically installed in a non-removable manner in the handle 11, such as by molding the rearmost portion 31 of the blade into a plastic handle at the time the utensil is being manufactured. I am not to be limited to this arrangement, however, for in some instances the blade may be made removable from the handle.

As a result of the construction illustrated in FIGS. 1 and 4, a crab shell traveling along the open ended slot 25 as a result of a user grasping the handle 11 and forcing the blade 13 along the shell in a generally linear motion is caused to stay in contact with the undersurface 23 of member 21. Note FIGS. 6 and 7 in this regard, observing that the arcuately shaped configuration of the inner portion 27 of the tip plays an important role in keeping the utensil in proper alignment with the shell of the crustacean. Should a particularly tough portion of the shell be encountered, the user need only lift the handle in the manner shown in dashed lines in FIG. 7 in order to achieve a breaking of the shell by the blade 13.

As a result of the rear blade portion 19 extending into the recess or slot 30 in the undersurface 23, the shell must be severed in order for the rearward motion of the shell to continue. The rear, upturned blade portion 19 is forced through the shell of the crustacean as each side of the recess 30 serves, in effect, to hold the shell against the blade.

A secondary embodiment of my hand held utensil 10 adapted for opening elongate sections of crab leg shells and similar objects is revealed in FIG. 8, with this embodiment being seen to comprise a manually engagable handle 12, upon one end of which a planar blade 14 is fixedly secured. The planar blade extends away from the handle generally parallel to the longitudinal centerline of the handle, with the blade terminating in an end or point 16 that is somewhat rounded rather than being sharp. The handle 12 may be oval in cross-section. Significantly, the blade 14 has an elongate, substantially straight sharpened edge 18, best seen in FIG. 10.

As seen in each of these several related figures, a blade-protecting member 22 is fixedly secured to the handle 12 and extends in a spaced relationship above the sharpened edge 18 of the blade 14. The blade-protecting member 22 extends away from the handle for a distance exceeding the length of the blade 14, as is made clear from FIGS. 8 and 10. The plane of the blade-protecting member or guard 22 is in an orthogonal or right-angle relationship to the plane in which the blade 14 is disposed, such that the sharpened edge 18 of the blade is adjacent a flat undersurface 24 of the blade-protecting member 22.

As a result of this arrangement, an open-ended slot 26 is defined between the sharpened edge 18 of the planar blade 14, and the flat undersurface 24 of the blade-protecting member 22. This slot extends from the pointed outermost or terminal end 16 of the blade, substantially along the longitudinal axis of the blade, and by virtue of this construction, the shell of a crab leg or the like can be readily straddled, as revealed by FIGS. 12 and 13.

The sharpened edge 18 of the blade 14 may extend upwardly at the innermost end of the slot 26, such that a sharpened, upwardly curving rearmost blade portion 20 is formed at the end of the slot 26 nearest the handle 12, although the inclusion of the rearmost blade portion 20 is not a firm requirement of this invention.

The slot 26 is adapted to receive the shell of a crustacean, such that the sharpened edge 18 moves along the interior of the leg or other portion of a crustacean. In this manner it is to be seen that as the sharpened edge 18 passes along the underside of the shell, it can cut through the shell as a user grasping the handle 12 moves or forces the blade 14 along the shell in a generally linear motion. During this mode of operation of my utensil, it is to be noted that the sharpened edge 18 of the blade is cutting the crustacean shell in a relatively smooth manner as the blade 14 moves along the interior of such shell. FIG. 12 illustrates this mode of use of my utensil.

As revealed in FIG. 9, the lower portion of the blade 14 is somewhat wide, whereas the upper portion of the blade has a distinctive, carefully sharpened edge 18. The blade 14 is of sturdy construction, such that the user can readily break open the shell of a crab leg or the like, without the blade bending or breaking.

FIGS. 8, 10 and 11 reveal that the handle 12 of this particular embodiment of by novel utensil may have an upper declivity or recess 32 in which the user of my utensil can place his or her thumb during the procedure of forcing the sharpened edge 18 of the blade 14 through the shell of the crustacean. In addition, a protrusion 34 may be placed on the underside of the handle, in a position slightly offset from the recess 32, in an effort to further prevent slippage of the user's hand along the handle 12; note FIG. 10. The protrusion 34 thus represents a member against which the curled forefinger of the user's hand may press during the opening of the shell of the crustacean. As may be noted from these several figures of drawing, my novel tool or utensil may be utilized equally well by a right-handed or a left-handed user.

From a careful inspection of FIGS. 8 and 10 it is to be seen that the terminal or outermost end of the blade-protecting member 22 forms an upturned portion 36 which, as mentioned hereinabove, extends further away from the handle than does the slightly sharpened terminal end 16 of the blade 14. The upturned portion or end 36 advantageously permits the user to employ my tool in a prizing mode at such time as a particularly tough shell portion is encountered.

It will be recalled that normally, the sharpened blade portion will break through the shell during the forcing of the blade 14 through the shell in the manner depicted in FIG. 12. However, should the progress of the blade through a particularly hard section of shell substantially impede forward progress of the blade, the user can lift the handle 12 away from the position shown in full lines in FIG. 13, to the position shown in dashed lines in FIG. 13. During this handle-lifting procedure, the sharpened edge 18 of the blade 14 is brought up under the shell of the crustacean in such a manner as to assure the shell breaking so that the meat in the leg or other portion of the crustacean can be liberated.

During this mode of use in which my utensil is utilized for prizing open the shell, the underside of the upturned portion 36 of the blade-protecting member 22 is brought into firm contact with an upper surface of the shell of the crustacean, in such manner as to represent a pivot point or fulcrum location 40; note FIG. 13. Because the blade-protecting member 22 is substantially wider than the blade 14, as depicted in FIGS. 8, 10 and 11, the "footprint" of the upturned portion 36 of the member 22 is sufficiently wide that it does not break through the shell of the crustacean. It is to be noted that if the upper member broke through the shell, such upper member would dig into the shell, thus substantially impeding any further progress of the blade along the leg or other portion of the crustacean. Because the wide upturned portion 36 rarely breaks through the shell, the user quite advantageously, is usually able to return to the linear mode of using my device as depicted in FIG. 12, without having to continue to use the utensil in a prizing mode.

Because the curved, upwardly turned portion 36 of the blade-protecting member 22 extends outward away from the handle for a greater extent than slightly sharpened tip 16 of the blade 14, the user, or the person adjacent the user, is quite adequately protected from being stabbed by the point 16 of the blade while the user is endeavoring to break open a tough shell. Thus, by the portion 36 having a greater effective length than the blade 14, the portion 36 performs an important safety function.

Although I am not to be limited to any particular way or manner of going about the creation of the hand held utensil of one-piece construction described hereinabove, I reveal in the drawing figures beginning with FIG. 14, one particularly effective yet economical procedure that may be followed.

In FIG. 14 I have shown a typical blank 40 of metal, out of which my novel utensil is to be made by cutting, stamping or the like. This flat blank may be of stainless steel, aluminum, or another type of non-rusting, non-corroding metal.

In FIG. 15 I show a rudimentary form 42 of my utensil, having been stamped out of the blank 40, and in FIG. 16, I show the rudimentary utensil 42 after a slot 26 of a certain length and width has been cut into one end of the utensil, thus dividing the blade portion into two essentially coextensive sections, but with the upper or blade-protecting section cut slightly longer than the blade. In other words, the cutting of the slot 26 serves to isolate the blade portion 14 from the blade-protecting member 22. At this point, the blade portion may be sharpened, and a pair of holes 46 may be drilled or otherwise formed in the flat, basic handle portion 48 of the utensil, approximately at the location where the utensil is to be grasped.

In FIG. 17 I show that the blade-protecting member 22 has been twisted approximately 90° away from the flat condition appearing in FIG. 16, with this twisting of the blade-protecting portion 22 serving to cause the flat undersurface of the blade-protecting portion to be a spaced distance away from the sharpened edge 18 of the blade portion 14. This twisting of the blade-protecting member 22 is followed by the step of bending the outer tip of the blade-protecting member 22 upwardly, to form the upturned portion 36.

In FIG. 18 I show the upturned tip or portion 36 in its final position, and I also show in this figure, the addition of hand-engaging members 50, utilized to enable the user to grasp the handle portion of the utensil in a comfortable and non-slip fashion. Typically I utilize a hand-engaging member 50 on each side of the basic handle portion 48, which hand-engaging or hand-contacting members may be held in place by appropriate rivets 52 or the like, although another securing means may be utilized if desired.

Although I am not to be limited to any particular dimensions or materials, the slot 26 may be relatively short, considering the overall length of the utensil. For example, the slot 26 may be between one and two inches long, typically one and one-half inches long, and the overall length of the tool may be approximately seven and one-half inches long. Therefore, the slot may be regarded as extending for approximately 20% of the length of the utensil.

As an example of the material used in this or the other embodiments, I may utilize 302 or 303 grade stainless steel, in which instance the blade-protecting portion can be twisted with respect to the blade at room temperature. If necessary, the utensil can thereafter be hardened by heating to a suitable temperature. Any discoloration can be removed by polishing.

Alternatively, 6061 T6 aluminum can be utilized instead of stainless steel. An anodized finish may be used if desired, I am not limited to a utensil of one-piece construction, for as indicated in FIGS. 19 and 20, I may utilize a handle 52 that is separate from the blade 54 and the blade-protecting member 62. In FIGS. 19 and 20 only a portion of the handle 52 is visible, but it is understood to be of sufficient length as to be readily grasped by the user.

One or a pair of slots, which may be regarded as blade-receiving slots, are located in the end of the handle, for receiving the mounting portion 55 of the blade 54, and the mounting portion 63 of the blade-protecting member 62. I prefer to utilize a "T" shaped slot 64 in the end of the handle 52, but I am not to be limited to this, for two separated slots, disposed in a right-angle relationship, may be utilized if desired.

In FIG. 21 I reveal that the blade 54 and the blade-protecting member or guard 62 may be separate components, whereas in FIG. 22 I reveal, as an alternative, that the blade 54 may be integral with the blade-protecting member 62.

It is now to be seen that I have provided a plurality of embodiments of a hand held utensil of low cost, that can be utilized very effectively either in the linear mode depicted in FIGS. 6 and 12, or in the prizing mode shown in FIGS. 7 and 13, by users of all ages and conditions of health.

Whether made of a single piece of metal, or assembled from separate handle and blade components, the various embodiments of my hand-held utensil may be used in an entirely safe and highly effective manner for enabling a user to gain easy access to the meat contained in a crab leg or the like.

Insofar as usage is concerned, the underside of the blade 13 of the primary embodiment, or the underside of the blade 14 of the secondary embodiment may be used to make the initial entry into a shell. In such instance, the user need only apply a bit of downward pressure to the handle or to the upper part of the utensil. In the case of the principal embodiment, the arcuately shaped inner tip portion 27 would be placed at a relatively steep angle upon the top of the shell, which makes it a simple matter for the user to push the tip 15 of the blade 13 downwardly through the shell, so that the cutting of the shell substantially throughout its length by a smooth linear motion can be started.

I claim:

1. A hand held utensil adapted to open elongate sections of crab leg shells and similar objects, said utensil comprising:
   a) a manually engagable handle,
   b) a planar blade secured to said handle and extending outwardly therefrom to form a somewhat rounded tip, with the forward portion of said blade adjacent said tip being substantially straight.
   c) a blade-protecting member secured in a spaced relationship adjacent said substantially straight forward portion of said blade, with said blade-protecting member extending from said handle for a distance exceeding the length of said blade,
   d) an open-ended slot defined between said substantially straight forward portion of said blade and said blade-protecting member,
   e) said slot being adapted to receive the shell of a crustacean, such that said blade can cut through the shell as user grasping said handle moves said blade longitudinally along the shell,
   f) said blade being multiangled, with a rear portion of said blade extending upwardly from said substantially straight forward blade portion in the direction of the adjacent undersurface of said blade-protecting member, said undersurface having a recess therein into part of which said upwardly extending rear portion of said blade extends, thus to provide assured shell-cutting capability when said blade and recess are brought into contact with the shell of a crustacean.

2. The hand held utensil adapted to open elongate sections of crab leg shells and similar objects as recited in claim 1 in which said upwardly extending rear blade portion merges smoothly with said substantially straight forward portion of said blade.

3. The hand held utensil adapted to open elongate sections of crab leg shells and similar objects as recited in claim 1 in which said upwardly extending rear blade portion forms an obtuse angle with said substantially straight forward portion of said blade.

4. The hand held utensil adapted to open elongate sections of crab leg shells and similar objects as recited in claim 1 in which the portion of the blade-protecting member most remote from said handle has a concavity generally conforming to the configuration of a crab leg shell, thus to be a guide for said blade and functioning to maintain proper contact with the shell.

5. The hand held utensil adapted to open elongate sections of crab leg shells and similar objects as recited in claim 1 in which the outermost edge of said blade-protecting member serves to protect the user or a person adjacent the user from being unintentionally stabbed by said tip of said blade during usage of said utensil, the outermost edge of said blade-protecting member being recessed so as to generally conform to the configuration of the crab leg shell and to serve as a guide for the blade.

6. The hand held utensil adapted to open elongate sections of crab leg shells and similar objects as recited in claim 1 in which said handle is made of plastic and said blade is made of metal.

7. The hand held utensil adapted to open elongate sections of crab leg shells and similar objects as recited in claim 1 in which said handle and said blade are constructed from a single piece of metal.

8. The hand held utensil adapted to open elongate sections of crab leg shells and similar objects as recited in claim 7 in which a pair of hand-engaging members are secured to said handle, one on each side thereof.

9. The hand held utensil adapted to open elongate sections of crab leg shells and similar objects as recited in claim 1 in which said handle is separate from said blade, said blade having a mounting portion thereon, and said handle having a blade-receiving slot in one end thereof, said mounting portion of said blade being receivable in said blade-receiving slot in said handle.

10. The hand held utensil adapted to open elongate sections of crab leg shells and similar objects as recited in claim 1 in which said handle is separate from said blade and said blade-protecting member, said blade and said blade-protecting member each having a mounting portion thereon, and said handle having a pair of blade-receiving slots in one end thereof, said mounting portions of said blade and said blade-protecting member being receivable in respective ones of said blade-receiving slots in said handle.

11. The method of creating a hand held utensil adapted to open elongate sections of crab legs and the like, said method comprising the steps of creating a flat plate of generally rectangular shape that is slightly larger than the utensil to be created;

stamping out of said plate, a utensil having a handle portion and a blade portion;

slotting the end of said utensil opposite said handle so as to create a blade portion and a portion opposite said blade portion;

twisting said portion opposite said blade portion for approximately 90° so as to create a blade-protecting portion essentially coextensive with said blade, but with said blade-protecting portion being slightly longer than said blade;

and bending upwardly the end of said blade-protecting portion in a direction opposite said blade, thus to create a fulcrum point arranged to contact a portion of the shell of the crustacean where a type of prizing action is being utilized during the opening of a crustacean shell.

12. The method as recited in claim 11 including the additional step of forming a pair of holes in said handle portion;

installing a hand-engaging portion on each side of said handle portion; and then affixing one of said hand-engaging portions onto each side of said handle.

13. A hand held utensil adapted to open elongate sections of crab leg shells and similar objects, said utensil comprising:

a) a manually engagable handle, b) a planar blade secured to said handle and extending along the longitudinal centerline of said handle outwardly to form a somewhat rounded tip, with the forward portion of said blade adjacent tip being substantially straight, c) a blade-protecting member secured in a spaced relationship adjacent said substantially straight forward portion of said blade, with said blade-protecting member extending from said handle for a distance exceeding the length of said blade, d) the adjacent undersurface of said blade-protecting member being in a plane that is in a substantially orthogonal relationship to the plane of said blade.

e) an open-ended slot defined between said substantially straight forward portion of said blade and said blade-protecting member, f) said slot being adapted to receive the shell of a crustacean, such that said blade can cut through the shell as a user grasping said handle moves said blade longitudinally along the shell, g) said blade being multiangled, with a rear portion of said blade extending upwardly from said substantially straight blade portion in the direction of the adjacent undersurface of said blade-protecting member, said undersurface having a recess therein into part of which said upwardly extending rear portion of said blade extends, thus to provide assured shell-cutting capability when said slot is brought into contact with the shell of a crustacean.

14. The hand held utensil adapted to open elongate sections of crab leg shells and similar objects as recited in claim 13 in which said upwardly extending rear blade portion merges smoothly with said substantially straight forward portion of said blade.

15. The hand held utensil adapted to open elongate sections of crab leg shells and similar objects as recited in claim 13 in which said upwardly extending rear blade portion forms an obtuse angle with said substantially straight forward portion of said blade.

16. The hand held utensil adapted to open elongate sections of crab leg shells and similar objects as recited in claim 13 in which the portion of the blade-protecting member most remote from said handle has a concavity generally conforming to the configuration of a crab leg shell, thus to be a guide for said blade and functioning to maintain proper contact with the shell.

17. The hand held utensil adapted to open elongate sections of crab leg shells and similar objects as recited in claim 13 in which the outermost edge of said blade-protecting member serves to protect the user or a person adjacent the user from being unintentionally stabbed by said tip of said blade during usage of said utensil, the outermost edge of said blade-protecting member being recessed so as to generally conform to the configuration of the crab leg shell and to serve as a guide for the blade.

18. The hand held utensil adapted to open elongate sections of crab leg shells and similar objects as recited in claim 13 in which said handle is made of plastic and said blade is made of metal.

19. The hand held utensil adapted to open elongate sections of crab leg shells and similar objects as recited in claim 13 in which said handle and said blade are constructed from a single piece of metal.

20. The hand held utensil adapted to open elongate sections of crab leg shells and similar objects as recited in claim 19 in which a pair of hand-engaging members are secured to said handle, one on each side thereof.

21. The hand held utensil adapted to open elongate sections of crab leg shells and similar objects as recited in claim 13 in which said handle is separate from said blade, said blade having a mounting portion thereon, and said handle having a blade-receiving slot in one end thereof, said mounting portion of said blade being receivable in said blade-receiving slot in said handle.

22. The hand held utensil adapted to open elongate sections of crab leg shells and similar objects as recited in claim 13 in which said handle is separate from said blade and said blade-protecting member, said blade and said blade-protecting member each having a mounting portion thereon, and said handle having a pair of blade-receiving slots in one end thereof, said mounting portions of said blade and said blade-protecting member being receivable in respective ones of said blade-receiving slots in said handle.

23. A utensil adapted to break and open elongate sections of crab leg shells and similar objects, said utensil comprising:

a) a manually engagable handle, b) a planar blade portion secured to said handle and presenting a sharpened edge extending to a tip, c) a blade-protecting member spaced a substantially consistent distance from said sharpened edge, d) a portion of said blade-protecting member comparatively remote from said handle extending outwardly beyond said tip, thus to protect the user or an adjacent person from injury by said tip during usage of said utensil, e) the outermost end of said blade-protecting member having a relatively wide upturned portion, with said upturned portion possessing curvature generally conforming to the upper surface of a crab leg to be opened, f) said upturned portion forming an acute angle with respect to the longitudinal axis of said blade-protecting member, with the angularity of said upturned portion advantageously providing clearance for the fingers of a user grasping said handle while said upturned portion is being moved along in close conformance with the upper surface of the shell of the crab leg.

24. The hand held utensil adapted to open elongate sections of crab leg shells and similar objects as recited in claim 23 in which a portion of said sharpened edge extends around the innermost portion of said slot and into contact with the near side of said blade-protecting member, thus to provide shell-cutting capability when the innermost portion of said slot is brought into contact with the shell of a crustacean.

25. The hand held utensil adapted to open elongate sections of crab leg shells and similar objects as recited in claim 23 in which said handle is separate from said blade, said blade having a mounting portion thereon, and said handle having a blade-receiving slot in one end thereof, said mounting portion of said blade being receivable in said blade-receiving slot in said handle.

* * * * *